UNITED STATES PATENT OFFICE.

FRIEDRICH SAUER, OF SCHÖNEBERG, GERMANY, ASSIGNOR OF ONE-HALF TO THE DAMPF-KORNBRENNEREI UND PRESSHEFEN-FABRIKEN ACTIEN-GESELLSCHAFT, VORMALS HEINRICH HELBING, OF WANDSBECK-HAMBURG, GERMANY.

PROCESS OF MANUFACTURING MALT WINE.

SPECIFICATION forming part of Letters Patent No. 576,510, dated February 2, 1897.

Application filed May 5, 1891. Serial No. 391,622. (No specimens.) Patented in Germany June 20, 1890, No. 58,161.

*To all whom it may concern:*

Be it known that I, FRIEDRICH SAUER, doctor of philosophy, a subject of the King of Prussia, Emperor of Germany, residing at Schöneberg, near Berlin, in the Kingdom of Prussia, Germany, have invented a new and useful Process of Manufacturing Malt Wine, (for which I have obtained Letters Patent of Germany, No. 58,161, dated June 20, 1890,) of which the following is a specification.

My new malt wine, which may be made in many varieties, as, for example, sherry, Malaga, or Tokay, has a specific gravity of 1.0202 to 1.0960, and contains by volume twelve to 18.7 per cent. of ethylic alcohol, 0.5 to one per cent. of lactic acid, 0.19 to 0.40 per cent. of glycerin, with smaller amounts of succinic acid, acetic acid, acetal, and volatile organic ethers. It contains from five to about twenty per cent. of sugar, calculated as dextrose, but almost wholly maltose, along with about five per cent. saccharose in the sweetest varieties to none in others. Every one hundred cubic centimeters contain from ten to thirty grams of extractive, according to kind. These consist of maltose and invert sugar, of dextrine and other gum-like substances, soluble albuminoids, mineral matter common to cereals, &c. It contains from 0.05 to 0.20 grams nitrogen, corresponding to 0.312 to 1.250 grams albuminoids. The phosphoric acid of its phosphates amounts to 0.06 to 0.25 per cent.

My malt wine possesses either a nutty or a bread-like flavor, due to the oxidation of the products formed by heat during the drying of the malt. Its aroma can be that of any rich grape wine by carefully selecting a proper wine-yeast, as indicated by the experiments of Rommier, Duclaux, and others. It can be kept indefinitely in good condition without the addition of any antiseptic. Its high per cent. of alcohol makes it stimulating and tonic. Its lactic acid renders it antipyretic and tonic. Its high per cent. of phosphoric acid as phosphates gives it a special alterative, nutritive, and nerve-tonic quality. Its albuminoids and maltose make it an easily-assimilated nutritive.

The albuminoids contained in my malt wines are precipitated almost entirely upon the addition of tannic acid. The albuminoids of grape wines remain in solution after the addition of tannic acid. It differs, further, from all grape wines or wines from other fruit in the character of its sugar, which is mainly maltose instead of invert sugar; in the character of its acid, which is chiefly lactic; in having double the amount of solids other than sugar, and hence double the nutritive value; in having less than half the amount of glycerin, and in having two or more times the amount of phosphoric acid as phosphates; in having more albuminoids. It differs from artificial wines in having the natural albuminoids and phosphates of cereals, in containing lactic acid, maltose, malto-dextrine. It differs from the barley and other grain wines of George Eugene Jacquemin (Patent No. 9,363, dated July 1, 1887) in containing by volume twelve to 18.7 per cent. of ethylic alcohol, not artificially added, instead of five to about ten per cent.; in possessing no malt flavor, but instead thereof a nutty or a bread-like one; in being free from tartaric acid, cream of tartar, and citric acid; in containing a large amount of lactic acid, and in having the perfect flavor of rich grape wines instead of a mixed flavor of these and of beer. It differs from beers in its large amount of alcohol, absence of malt taste, greater acidity, vinous aroma, &c. It is wholly unlike any drink hitherto produced, in the ways herein indicated. It differs also from beers having basic beer-like flavor and another flavor added thereupon in that this wine has intrinsically the flavor of wine and not of beer.

In carrying out my process practically I proceed as follows:

First. Dry malt is ground into a coarse meal.

Second. One thousand kilograms of this meal are placed in a large copper tank containing three thousand liters of pure water at a temperature of 25° to 30° centigrade. This is slowly heated by steam-pipes until at the expiration of six or eight hours it has reached a temperature of from 62° to 70° centigrade. During this time the starch is converted into maltose.

Third. It is now passed as rapidly as possible at this high temperature through a large wooden straining-vat having a finely-perforated false copper bottom snugly fitted in in sections upon a supporting-rim that sustains it securely at a height of about three inches from the true bottom. A number of metal faucets, the exits of which are on a level with the true bottom, are used to draw off the clear liquid when strained from the solid malt waste.

Fourth. This strained liquid is next carried by aid of pipes to a second large wooden vat, where at a temperature of 48° to 50° centigrade it is subjected to the action of the ferment of lactic acid. It remains at this temperature for from fifteen to sixteen hours or until sufficient lactic acid has developed so that twenty cubic centimeters will require ten cubic centimeters of normal volumetric sodium hydrate to neutralize it, after which it is cooled to the temperature of the room or vault. After the lactic-acid ferment is once started in a vat enough of it remains to infect all successive supplies of malt extract that may be placed therein.

Fifth. (a) Into a third large wooden vat one hundred and twenty liters of the finished product of the second vat is placed, together with thirty or forty liters of a specially-prepared yeast, (Tokay, sherry, port, Malaga, or other yeast,) as hereinafter described. These are maintained at a temperature as near as possible to 26° centigrade by aid of cold water circulating through metal pipes. As the yeast multiplies the temperature tends to rise. When the pabulum is consumed, its development ceases. This occurs in from fifteen to twenty hours. Then enough of the product of the second vat is added to increase the total to eight hundred and fifty liters. In fifteen or twenty hours more a fresh addition from the third vat raises the total to two thousand liters. At the expiration of another fifteen or twenty hours it is raised in the same manner to five thousand liters. During this whole time the temperature is kept down to about 26° centigrade by aid of the cold water circulating through the metal pipes that are in contact therewith. (b) As soon as the last addition from the second vat has ceased to produce more yeast about one hundred pounds of pure white sugar is also added. I now wait until all the sugar has been consumed and its equivalent of alcohol been produced. I then add another one hundred pounds of sugar, pausing again until this is consumed. Successive additions are in this way made until the alcoholic strength is that required for the particular form of wine being produced. These successively-repeated additions of sugar maintain the most favorable conditions for the activity and life of the yeast-cells. To add all the sugar at once or in larger proportion than this would make so sudden a change in the strength of the extract that it would seriously impair the vitality of the yeast and make the production of malt wine impossible. All the fermentations of this third vat consume about five weeks of time.

Sixth. As soon as the contents of the third vat have reached the proper or required alcoholic strength they are transferred to a fourth vat for sterilization and oxidation. To the bottom of this vat pass metal pipes with closed ends, but having many small perforations through which sterilized air is forced, while the temperature is again and again, through many successive times during a period of four weeks, raised to 70° centigrade and as frequently cooled to 37° centigrade. This treatment kills the ferment or yeast and all bacteria that may have entered from the air. It also destroys all malt or beer like flavor and substitutes therefor one that can be compared to a blended nut and fresh-bread flavor.

Seventh. The contents of the fifth vat are next transferred to a sixth or cooling vat, where the temperature is reduced to the ordinary one of the working-room. Here the muddy material settles to the bottom, after which the clear supernatant liquid is drawn off.

Eighth. This liquid is now stored in extra large vats in quantities of twenty-five thousand liters, so as to render the finished products of various times of making homogeneous and their tastes uniform. From this vat the supply is drawn for bottling and preparing for the market.

*Method of Preparing the Yeast for Malt Wine.*

First. A very minute quantity of the "bloom" from the outer surface of the particular variety of grape (Tokay, sherry, port, Malaga, &c.) that the malt wine must resemble is mixed thoroughly in a glass flask with melted nutrient gelatin.

Second. This mixture is poured out evenly on a horizontally-placed sterile glass plate.

Third. When the gelatin congeals, the plate is placed in a damp culture-chamber and kept steadily at a temperature of about 26° centigrade for two or three days. During this time the attenuated mass of the spores of the bloom from the grape develops into separate colonies. Each colony represents the growth from a single spore.

Fourth. A second glass flask containing twenty-five cubic centimeters of sterilized nutritive gelatin is now inoculated by aid of a sterile platinum wire from a single colony of the desired micro-organisms on the gelatin plate. This flask is placed in the culture-chamber and kept at about 26° centigrade for two or three days. This gives a pure culture of the desired ferment.

Fifth. After melting the gelatin of this pure culture at the lowest possible temperature two hundred cubic centimeters of the before-described clear malt extract from the first wooden vat is poured in and thoroughly mixed with it. This is kept at a temperature of 26° centigrade for twenty-four to forty-eight hours, when it is ready for use.

What I claim as my invention, and desire to secure by Letters Patent, is—

1. A wine containing at least five per cent. of sugar, principally maltose free from malt flavor, containing twelve per cent. of unadded ethylic alcohol, and 0.5 per cent. of lactic acid, substantially as described.

2. A wine containing at least five per cent. of sugar, principally maltose free from malt flavor and containing sufficient ethylic alcohol and lactic acid to prevent fermentation without the addition of other antiseptic substances, substantially as described.

3. In the manufacture of malt wine, the process of destroying the malt flavor and bringing out the wine flavor of the wine by treating a wine possessing both a malt and wine flavor with sterilized air while in a warm condition, substantially as described.

4. In the manufacture of malt wine, the process of preparing a malt wort, subjecting the same to the action of the ferment of lactic acid, infecting the wort with the special ferments of wines to produce the flavors desired, and subsequently adding successively definite amounts of cane-sugar, thereby enabling the ferments to continue their activity without lessening said activity by the addition of superabundant sugar, substantially as described.

5. In the production of malt wine, the process of treating a malt wort with a special wine ferment as desired, in subsequently adding definite quantities of cane-sugar, and in finally treating the liquid possessing both a malt and wine flavor at a high temperature to destroy the malt flavor and bring out the flavor of the wine by sterilized air, substantially as described.

6. In the manufacture of malt wine, the process of subjecting the wort to the action of a lactic-acid ferment, in subsequently adding a special wine ferment as desired, in subsequently adding definite quantities of cane-sugar, and in finally treating the liquid possessing both a malt and wine flavor at a high temperature to destroy the malt flavor and bring out the flavor of the wine by sterilized air, substantially as described.

In testimony whereof I have signed my name to this specification in the presence of two subscribing witnesses.

FRIEDRICH SAUER.

Witnesses:
G. HÜLSMANN,
B. POHLEY.